United States Patent
Ka et al.

(10) Patent No.: US 9,525,175 B2
(45) Date of Patent: Dec. 20, 2016

(54) NEGATIVE ELECTRODE FOR SECONDARY LITHIUM BATTERY, AND SECONDARY LITHIUM BATTERY

(75) Inventors: Bok-Hyun Ka, Yongin-si (KR); Kyeu-Yoon Sheem, Yongin-si (KR); Da-Woon Han, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 644 days.

(21) Appl. No.: 12/947,766

(22) Filed: Nov. 16, 2010

(65) Prior Publication Data

US 2011/0294014 A1    Dec. 1, 2011

(30) Foreign Application Priority Data

May 25, 2010  (KR) .................. 10-2010-0048738

(51) Int. Cl.
*H01M 10/052* (2010.01)
*H01M 10/054* (2010.01)
*H01M 4/131* (2010.01)
*H01M 4/13* (2010.01)
*H01M 4/134* (2010.01)
*H01M 4/62* (2006.01)
*H01M 4/133* (2010.01)
*H01M 4/04* (2006.01)
*H01M 4/02* (2006.01)

(52) U.S. Cl.
CPC ............ *H01M 4/62* (2013.01); *H01M 4/133* (2013.01); *H01M 4/134* (2013.01); *H01M 10/052* (2013.01); *H01M 4/0404* (2013.01); *H01M 2004/027* (2013.01); *Y02E 60/122* (2013.01)

(58) Field of Classification Search
CPC .. H01M 10/052; H01M 10/054; H01M 4/131; H01M 4/13; H01M 4/134
See application file for complete search history.

(56) References Cited

U.S. PATENT DOCUMENTS

| | | | |
|---|---|---|---|
| 2005/0164090 A1* | 7/2005 | Kim et al. | 429/232 |
| 2005/0208380 A1 | 9/2005 | Park et al. | |
| 2007/0148545 A1* | 6/2007 | Amine et al. | 429/231.1 |
| 2009/0162750 A1* | 6/2009 | Kawakami et al. | 429/218.1 |

FOREIGN PATENT DOCUMENTS

| | | |
|---|---|---|
| JP | 2001-351688 A | 12/2001 |
| JP | 2003-077458 A | 3/2003 |

(Continued)

OTHER PUBLICATIONS

Korean Notice of Allowance dated Apr. 4, 2012, 5 pages.
Korean Office Action issued by KIPO dated Jan. 31, 2012, 3 pages.

*Primary Examiner* — Barbara Gilliam
*Assistant Examiner* — Angela Martin
(74) *Attorney, Agent, or Firm* — Knobbe Martens Olson & Bear LLP

(57) ABSTRACT

Disclosed is a negative electrode for a secondary lithium battery and a secondary lithium battery including the same, wherein the negative electrode includes a current collector and a negative active material layer formed on the current collector, and the negative active material layer includes an additive including a core including a metal oxide and a metal coating layer formed on the core, and a negative active material.

18 Claims, 1 Drawing Sheet

(56) References Cited

FOREIGN PATENT DOCUMENTS

| | | | | |
|---|---|---|---|---|
| JP | 10-2005-0079899 A | | 8/2005 | |
| JP | 2005-294079 | * | 10/2005 | .............. H01M 4/02 |
| JP | 2008-004460 | | 1/2008 | |
| JP | 2009-277509 | | 11/2009 | |
| KR | 10-2002-0003742 A | | 1/2002 | |
| KR | 10-2005-0102871 A | | 10/2005 | |
| KR | 1020050009226 | * | 1/2007 | .............. H01M 4/62 |
| KR | 10-2007-0088534 A | | 8/2007 | |
| KR | 10-2007-0120734 A | | 12/2007 | |
| KR | 102007006663 | * | 6/2008 | .............. H01M 4/48 |

* cited by examiner

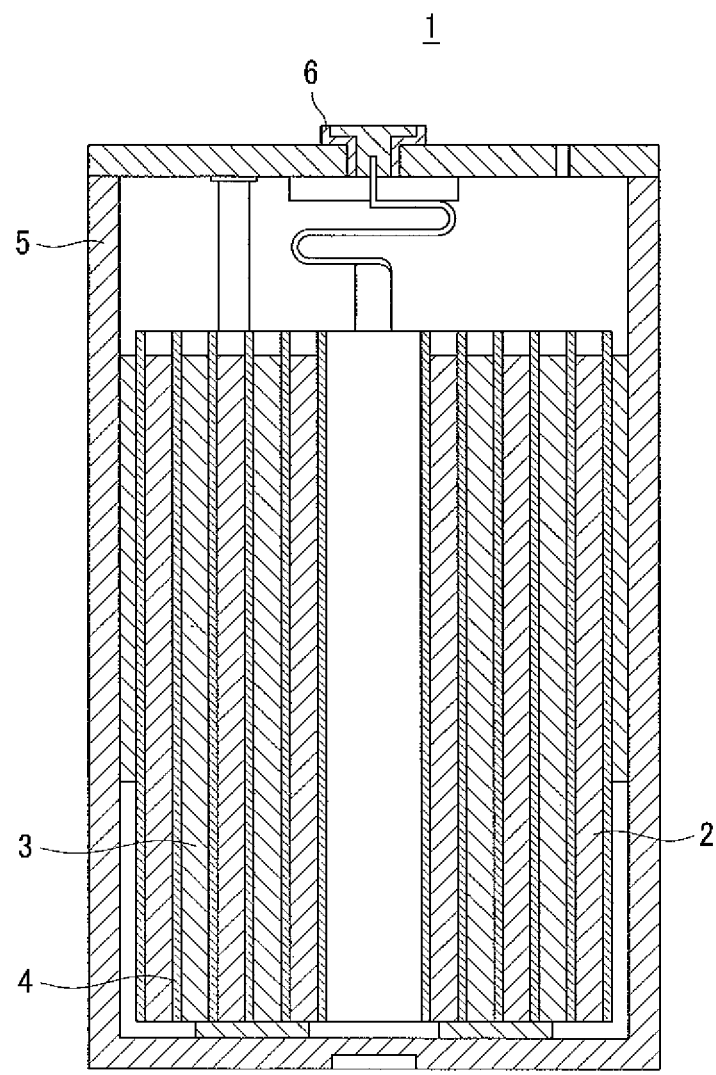

NEGATIVE ELECTRODE FOR SECONDARY LITHIUM BATTERY, AND SECONDARY LITHIUM BATTERY

CROSS-REFERENCE TO RELATED APPLICATIONS

This application claims priority to and the benefit of Korean Patent Application No. 10-2010-0048738 filed in the Korean Intellectual Property Office on May 25, 2010, the entire contents of which are incorporated herein by reference.

BACKGROUND

1. Field

This disclosure relates to a negative electrode for a secondary lithium battery and a secondary lithium battery including the same.

2. Description of the Related Technology

A secondary lithium battery is an energy storage device including a lithium metal oxide positive active material and a carbon-based negative active material and expressing a capacity though a redox reaction of intercalating and deintercalating lithium ions to and from the positive active material and the negative active material. The secondary lithium battery is generally used for an energy source of a small electronic device such as a mobile phone and a laptop computer, and has been developed to have enhanced energy density.

However, the demands for high input required fields such as an elevator, an automobile, and the high power required fields such as machine tools, hybrid electric vehicles (HEV), and electric vehicles (EV) have been increasing, so research on developing a battery having high input power has been undertaken.

The conventional energy storage device having high input power is an electrochemical capacitor (electrical capacitor). The electrochemical capacitor stores charges through adsorption and desorption of charges in a bilayer formed at an interface of between an electrode and an electrolyte by static electricity gravitation, different from the charge storage mechanism (redox reaction) of a secondary lithium battery.

Accordingly, the electrochemical capacitor has a merit of higher input power but has a drawback of lower energy density compared to the secondary lithium battery. Due to the low energy density, the electrochemical capacitor has limits in application to the various fields.

In order to overcome the limit of low energy density, development of a hybrid capacitor in which one electrode includes an electrode material for a secondary lithium battery has been attempted.

On the other hand, research on a secondary lithium battery has been performed using active carbon as an electrochemical capacitor for an electrode to enhance the input power characteristics.

When the active carbon is added to the positive electrode, the active carbon is disposed to surround the positive active material. An electrical bilayer is formed on the interface of the active carbon by applying a potential, and then it may store charges through adsorbing and desorbing ions to provide the high input power characteristics.

In addition, since the active material is a porous material, the electrolyte solution impregnates the material well, thereby minimizing the transferring distance of ions and improving the high input power characteristics.

When the active carbon is added to the negative electrode, an electrical bilayer is formed on the interface between the negative electrode and the electrolyte during the first charge, so it may store charges through the adsorption and desorption.

When the potential is further decreased, the large surface area of active carbon causes a side reaction between the active carbon and the electrolyte. As a result, an SEI (Solid Electrolyte Interface) is formed on the surface of the active carbon causing resistance.

Thus the intercalated lithium ions are not deintercalated and remain during the discharge. Accordingly, there is an increased necessity to develop a material that minimizes the irreversible reaction in the negative electrode and to improve the high input power characteristics through minimizing the transmitting distance and the adsorption and desorption of ions.

SUMMARY OF CERTAIN INVENTIVE ASPECTS

One aspect of the present embodiments provides a negative electrode for a secondary lithium battery that may promptly store a charge through intercalating and deintercalating lithium ions during charge and discharge, and exhibits high input power characteristics.

Another aspect of the present embodiments provides a secondary lithium battery including the negative electrode.

According to one aspect, a negative electrode for a secondary lithium battery is provided that includes a current collector, and a negative active material layer disposed on the current collector. The negative active material layer includes an additive and a negative active material. The additive includes a core including a metal oxide, and a metal coating layer formed on the core.

The metal coating layer may include a metal selected from Ni, Cu, Mn, Co, Fe, or a combination thereof.

The metal coating layer may be included at 20 wt % to 70 wt % based on the total weight of the additive.

The metal coating layer may have a thickness of 1 nm to 100 nm.

In addition, the core may have a specific surface area of 50 $m^2/g$ to 1000 $m^2/g$.

According to one embodiment, the metal oxide may be selected from $SiO_2$, $Al_2O_3$, $VO_2$, $SrO$, $Y_2O_3$, $ZrO_2$, $CeO_2$, $MgO$, $Ce_2O_3$, or a combination thereof.

The additive may be included at 1 wt % to 30 wt % based on the total weight of the negative active material layer.

The additive may further include a carbon coating layer formed on the surface of the metal coating layer.

The carbon coating layer comprises a material selected from the group consisting of citric acid, sucrose, dihydroxy naphthalene, phenol resin, polyvinyl chloride (PVC), or a combination thereof.

The carbon coating layer may have a thickness of 1 nm to 10 nm. In addition, the carbon coating layer may be included at 1 part by weight to 50 parts by weight based on 100 parts by weight of the carbon coating layer.

According to another embodiment, a secondary lithium battery is provided that includes the negative electrode including a negative active material, a positive electrode including a positive active material, and a non-aqueous electrolyte.

Hereinafter, further embodiments will be described in detail.

According to one embodiment, the negative electrode for a secondary lithium battery may promptly store a charge through intercalating and deintercalating lithium ions during the charge and discharge, so it may be usefully applied to a high input power energy storage device.

BRIEF DESCRIPTION OF THE DRAWING

FIG. 1 shows the structure of a secondary lithium battery according to one embodiment.

DETAILED DESCRIPTION OF CERTAIN INVENTIVE EMBODIMENTS

Example embodiments will hereinafter be described in detail. However, these embodiments are only examples, and the present embodiments are not limited thereto.

One embodiment provides a negative electrode for a secondary lithium battery including a current collector and a negative active material layer formed on the current-collector, wherein the negative active material layer includes an additive including a core including a metal oxide and a metal coating layer formed on the core, and a negative active material.

The metal of the coating layer may include one that does not react with lithium, and for example, it may include Ni, Cu, Mn, Co, Fe, or a combination thereof. Because the metal coating layer does not react with lithium and has excellent conductivity, it may have a wide surface area of metal oxide as an electrochemically effective surface area. In addition, since the metal coating layer has excellent conductivity, it may provide an electric bilayer in the interface between an additive and an electrolyte during initial charging of a secondary lithium battery including the same. In addition, the contact resistance between active material particles is decreased to decrease the resistance, so as to improve the high input power characteristics.

The metal coating layer may be included at from about 20 wt % to about 70 wt % based on the total weight of the additives. The core including a metal oxide may be included at from about 80 wt % to about 30 wt % based on the total weight of the additives. When the metal coating layer is included within the range, it may uniformly coat the surface of the metal oxide core and it may control the thickness of the coating layer to from about 1 nm to about 100 nm, so that the wide surface area of the metal oxide is maintained.

The metal coating layer may have a thickness of from about 1 nm to about 100 nm.

In addition, the core that comprises a metal oxide may have a high specific surface area of from about 50 m$^2$/g to about 1000 m$^2$/g. The metal oxide may be porous or non-porous. When the metal oxide is porous, the porosity is not limited as long as the specific surface area is within the range.

The high specific surface area may enhance the adsorption and desorption of charges to the electrical double layer formed between the additive within the working voltages and the electrolyte, so that it may improve the high input power characteristics. In addition, the electrolyte solution is well impregnated into the metal oxide and the transference distance of lithium ions is minimized to further improve the high input power characteristics.

According to one embodiment, the metal oxide may be, for example, $SiO_2$, $Al_2O_3$, $VO_2$, $SrO$, $Y_2O_3$, $ZrO_2$, $CeO_2$, $MgO$, $Ce_2O_3$, or a combination thereof. The metal oxide may have an average particle diameter of from about 10 nm to about 1 μm. When the metal oxide has an average particle diameter within the range, it has a smaller size than the negative active material, so that it may surround the active material surface. That is, it covers well and maintains the wide surface area.

The additive may be included at from about 1 wt % to about 30 wt % based on the total weight of the negative active material layer. When the additive is included in the range, it may improve the high input power characteristics while not significantly decreasing the capacity of the battery.

The additive may further include a carbon coating layer formed on the surface of the metal coating layer.

The carbon coating layer may comprise a material selected from the group consisting of citric acid, sucrose, dihydroxy naphthalene, phenol resin, polyvinylchloride, and a combination thereof.

The carbon coating layer may have a thickness of from about 1 nm to about 10 nm. In addition, the carbon coating layer may be included at from about 1 part by weight to about 20 parts by weight based on 100 parts by weight of the additive. When the carbon coating layer has the thickness and the amount within the ranges, it may enhance the initial coulomb efficiency while not deteriorating the capacity.

Since the redox reaction is more rapidly performed in the additives having the composition than in the negative active material, it may provide an electrical bilayer in the interface of between the additive and the electrolyte during the initial charge. In addition, a non-faradaic reaction may be induced due to the ion adsorption at the interface of the electrolyte, and due to the wide surface area, while the faradaic reaction with lithium is rarely performed, it may decrease the current density. Accordingly, when the negative electrode includes the additive, it may very promptly store the charge by adsorbing and desorbing lithium ions, and it may be usefully applied to a high-input power energy storage device.

The additive may be prepared by coating a metal on the metal oxide according to a chemical method or a physical method to provide a metal coating layer on the metal oxide surface. The chemical method may include electroplating or electroless plating, and the physical method may include chemical vapor deposition (CVD), sputtering, mechano-fusion, ball-milling, and the like.

In addition, the carbon coating layer may be formed on the surface of the metal coating layer in accordance with chemical vapor deposition (CVD), mechano-fusion, ball-milling, or liquid precipitation.

In the negative electrode of the present embodiments, a negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbonaceous material. The carbonaceous material may be any generally-used carbon-based negative active material for a lithium ion secondary battery. Examples of the carbon material include crystalline carbon, amorphous carbon, and a mixture thereof. The crystalline carbon may be shapeless, or sheet, flake, spherical, or fiber shaped natural graphite or artificial graphite. The amorphous carbon may be a soft carbon, a hard carbon, mesophase pitch carbide, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ ($0<x<2$), a Si-Q alloy (where Q is an element selected from the group consisting of an alkaline metal, an alkaline-earth metal, a group 13 element, a group 14 element, a transition element, a rare earth element, and combinations thereof, and is not Si), Sn, SnO$_2$, a Sn—R alloy (where R is an element selected from the group consisting of an alkaline metal, an alkaline-earth metal, a group 13 element, a group 14 element, a transition element, a rare earth element, and combinations thereof, and is not Sn), and mixtures thereof. At least one of these materials may be mixed with SiO$_2$. The elements Q and R are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide of the following Chemical Formula 1 or 2, or lithium titanium oxide of the following Chemical Formula 3.

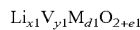   Chemical Formula 1

$$Li_{x1}V_{y1}M_{d1}O_{2+e1}$$

In Chemical Formula 1, $1 \leq x1 \leq 2.5$, $0.5 \leq y1 \leq 1.5$, $0 \leq d1 \leq 0.5$, $0 \leq e1 \leq 0.5$, and M is Mg, Al, Cr, Mo, Ti, W, Zr, Si, Sc, Cu, Nb, Y, or a combination thereof.

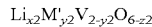   Chemical Formula 2

$$Li_{x2}M'_{y2}V_{2-y2}O_{6-z2}$$

In Chemical Formula 2, $0 \leq x2 \leq 1.2$, $0 \leq y2 \leq 2$, $-2 \leq z2 \leq 2$, and M' is Mo, Mn, Co, Ni, or a combination thereof.

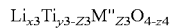   Chemical Formula 3

$$Li_{x3}Ti_{y3-z3}M''_{z3}O_{4-z4}$$

In Chemical Formula 3, $0.6 \leq x3 \leq 2.5$, $1.2 \leq y3 \leq 2.3$, $0 \leq z3 \leq 0.5$, $0 \leq z4 \leq 0.5$, and M'' is V, Cr, Nb, Fe, Ni, Co, Mn, W, Al, Ga, or a combination thereof.

The negative active material layer of a negative electrode according to one embodiment may include from about 60 wt % to about 98 wt % of a negative active material based on the total weight of the negative active material layer.

The negative active material layer includes a binder, and optionally a conductive material as well as the negative active material and additive. The negative active material layer may include from about 1 wt % to about 10 wt % of a binder based on the total weight of the negative active material layer. In addition, when the negative active material layer further includes a conductive material, it may include from about 50 wt % to about 97 wt % of the negative active material, from about 1 wt % to about 10 wt % of the binder, and from about 1 wt % to about 10 wt % of the conductive material.

The binder improves properties for binding active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

Examples of the water-soluble binder include a styrene-butadiene rubber, an acrylated styrene-butadiene rubber, polyvinyl alcohol, sodium polyacrylate, a copolymer including propylene and a C$_2$ to C$_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of from about 0.1 to about 3 parts by weight based on 100 parts by weight of the binder.

The conductive material is included to improve electrode conductivity. It may include any electrically conductive material, unless it causes a chemical change. Examples of the conductive material include carbon-based materials such as natural graphite, artificial graphite, carbon black, acetylene black, ketjen black, carbon fiber, and the like; metal-based materials such as a metal powder, a metal fiber, or the like including copper, nickel, aluminum, silver, and the like; a conductive polymer such as a polyphenylene derivative; or a mixture thereof.

In a negative electrode according to one embodiment, the current collector may be selected from the group consisting of a copper foil, a nickel foil, a stainless steel foil, a titanium foil, a nickel foam, a copper foam, a polymer substrate coated with a conductive metal, and combinations thereof.

The secondary lithium battery according to another embodiment includes a negative electrode including the negative active material, a positive electrode including a positive active material, and a non-aqueous electrolyte.

At least one of the negative active material and the positive active material may be the active material according to one embodiment.

The negative electrode includes a negative active material layer including a negative active material and a binder, and a current collector supporting the negative active material layer.

The binder improves binding properties of active material particles among one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer including propylene and a C$_2$ to C$_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount from about 0.1 to about 3 parts by weight based on 100 parts by weight of the binder.

The current collector may be selected from the group consisting of a copper foil, a nickel foil, a stainless steel foil, a titanium foil, a nickel foam, a copper foam, a polymer substrate coated with a conductive metal, and combinations thereof.

The negative electrode may be fabricated by a method including mixing the negative active material, a conductive material, and a binder to provide an active material composition, and coating the composition on a current collector.

The solvent may be a polar aprotic solvent such as for example, N-methylpyrrolidone, but it is not limited thereto.

In another embodiment, a secondary lithium battery including the negative electrode, a positive electrode, and a non-aqueous electrolyte is provided.

The positive electrode includes a positive active material layer including a positive active material and a binder, and a current collector supporting the positive active material layer.

The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α<2); $Li_aNi_{1-b-c}Co_bX_cO_{2-\alpha}T_\alpha$ (0.90≤a≤1.8, 0≤b≤0.5, 0≤c≤0.5, 0<α<2); $Li_aNi_{1-b-c}Co_bX_cO_{2-\alpha}T_2$ (0.90≤a≤1.8, 0≤b≤0.5, 0≤c≤0.5, 0<α<2); $Li_aNi_{1-b-c}Mn_bX_cD_\alpha$ (0.90≤a≤1.8, 0≤b≤0.5, 0≤c≤0.05, 0<α<2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive active material may be included in an amount ranging from about 90 to about 98 wt % based on the total weight of the positive active material layer.

The positive active material layer also includes a binder and a conductive material. The binder and conductive material may be included in amounts of about 1 to about 5 wt % based on the total weight of the positive active material layer, respectively.

The binder improves binding properties of the positive active material particles among one another and also with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. It may include any electrically conductive material, unless it causes a chemical change. Examples of the conductive material include a carbon-based material such as natural graphite, artificial graphite, carbon black, acetylene black, ketjen black, a carbon fiber, and the like; a metal-based material such as a metal powder, a metal fiber or the like including copper, nickel, aluminum, silver, and the like; a conductive polymer such as a polyphenylene derivative; or a mixture thereof.

The current collector may be aluminum (Al), but is not limited thereto.

The positive electrode may be obtained by general process including mixing a positive active material, a binder, and a conductive material in a solvent to provide an active material composition; coating the active material composition on a current collector, and drying and pressing the same. The solvent includes N-methylpyrrolidone or the like, but is not limited thereto. The positive electrode-manufacturing method is well known and thus is not described in detail in the present specification.

The non-aqueous electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in a volume ratio ranging from about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio from about 1:1 to about 30:1.

The aromatic hydrocarbon-based organic solvent may be represented by the following Chemical Formula 4.

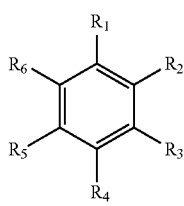

Chemical Formula 4

In Chemical Formula 4, $R_1$ to $R_6$ are independently selected from the group consisting of hydrogen, a halogen, a $C_1$ to $C_{10}$ alkyl group, a $C_1$ to $C_{10}$ haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, an ethylene carbonate-based compound represented by the following Chemical Formula 5, or a combination thereof to improve cycle-life as an additive.

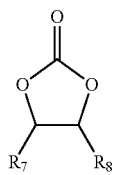

Chemical Formula 5

In Chemical Formula 5, $R_7$ and $R_8$ are independently selected from the group consisting of hydrogen, a halogen, a cyano group (CN), a nitro group ($NO_2$), and a $C_1$ to $C_5$ fluoroalkyl group, provided that at least one of $R_7$ and $R_8$ is selected from the group consisting of a halogen, a cyano group (CN), a nitro group ($NO_2$), and a $C_1$ to $C_5$ fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of vinylene carbonate or the ethylene carbonate-based compound used to improve cycle life may be adjusted within an appropriate range.

The lithium salt is dissolved in an organic solvent, supplies lithium ions in a battery, operates a basic operation of the secondary lithium battery, and improves lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

FIG. 1 is a schematic view showing the representative structure of a secondary lithium battery according to one embodiment. As shown in FIG. 1, the secondary lithium battery 1 includes a battery case 5 including a positive electrode 3, a negative electrode 2, and a separator interposed between the positive electrode 3 and the negative electrode 2, an electrolyte solution impregnated therein, and a sealing member 6 sealing the battery case 5.

The secondary lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. These examples, however, are not in any sense to be interpreted as limiting the scope of this disclosure.

EXAMPLE 1

Ni is coated on the surface of porous alumina using an electroplating process to provide an additive.

The prepared additive includes a $Al_2O_3$ core and a Ni metal coating layer formed on the core. The metal coating layer has a thickness of 5 nm, and the metal coating layer is included at 20 wt % based on the total amount of additive. In addition, the core has a surface area of 120 m²/g, and the core of $Al_2O_3$ has an average particle diameter of 200 nm.

EXAMPLE 2

Cu is coated by a sputtering method on the surface of nanoparticulate fumed silica which is inactive to lithium ions so as to provide an additive.

The obtained additive includes a SiO$_2$ core and a Cu metal coating layer formed on the core. The metal coating layer has a thickness of 10 nm, and the metal coating layer is included at 20 wt % based on the total weight of the additive. In addition, the core has a surface area of 65 m$^2$/g, and the core of SiO$_2$ has an average particle diameter of 50 nm.

EXAMPLE 3

20 wt % of the additive obtained from Example 1, 65 wt % of a soft carbon negative active material, 5 wt % of a carbon black conductive material, and 10 wt % of a polyvinylidene fluoride binder are mixed in N-methylpyrrolidone to provide a negative active material slurry.

The negative active material slurry is coated on one surface of a copper current collector at a thickness of 10 μm, and is dried and pressed to provide a negative electrode.

EXAMPLE 4

20 wt % of additives obtained from Example 2, 65 wt % of a soft carbon negative active material, 5 wt % of a carbon black conductive material, and 10 wt % of a polyvinylidene fluoride binder are mixed in N-methylpyrrolidone to provide a negative active material slurry.

The negative active material slurry is coated on a copper current collector in a thickness of 10 μm, and is dried and pressed to provide a negative electrode.

Comparative Example 1

20 wt % of porous Ni, 65 wt % of a soft carbon, 5 wt % of a carbon black conductive material, and 10 wt % of a polyvinylidene fluoride binder are mixed in N-methyl pyrrolidone to provide a negative active material slurry.

The negative active material slurry is coated on one surface of a copper current collector in a thickness of 10 μm, and is dried and pressed to provide a negative electrode.

Comparative Example 2

85 wt % of soft carbon, 5 wt % of a carbon black conductive material, and 10 wt % of a polyvinylidene fluoride binder are mixed in N-methylpyrrolidone to provide a negative active material slurry.

The negative active material slurry is coated on one surface of a copper current collector in a thickness of 10 μm, and is dried and pressed to provide a negative electrode.

Comparative Example 3

20 wt % of active carbon, 65 wt % of a soft carbon negative active material, 5 wt % of a carbon black conductive material, and 10 wt % of a polyvinylidene fluoride binder are mixed in N-methylpyrrolidone to provide a negative active material slurry.

The negative active material slurry is coated on one surface of a copper current collector in a thickness of 10 μm, and is dried and pressed to provide a negative electrode.

A 2016 coin-type half-cell is fabricated using each negative electrode obtained from Examples 3 and 4 and Comparative Examples 1 to 3, a lithium metal counter electrode, and a lithium metal. The electrolyte solution is prepared by dissolving 1M of LiPF$_6$ in a mixed solvent of ethylene carbonate, dimethyl carbonate, and diethyl carbonate (3:4:3 volume ratio).

The obtained half-cell is charged and discharged between 0.01 and 1.5V at 0.2 C, 5 C, and 10 C rates. When charged and discharged at a 0.2 C rate, they are measured for a charge capacity, discharge capacity, and coulomb efficiency and the results are shown in the following Table 1. In addition, the discharge capacity is measured during 5 C and 10 C charge and discharge, and that results are shown in the following Table 1. 5 C capacity % (5 C discharge capacity*100/0.2 C discharge capacity) and 10 C capacity % (10 C discharge capacity*100/0.2 C discharge capacity) are respectively determined by calculating % values of 5 C discharge capacity and 10 C discharge capacity with respect to the 0.2 C discharge capacity.

TABLE 1

|  | 0.2 C | | | 5 C | | 10 C | |
| --- | --- | --- | --- | --- | --- | --- | --- |
|  | Charge capacity/ mAhg$^{-1}$ | Discharge capacity/ mAhg$^{-1}$ | Coulomb efficiency/ % | Discharge capacity/ mAhg$^{-1}$ | 5 C capacity % | Discharge capacity/ mAhg$^{-1}$ | 10 C capacity % |
| Example 3 | 437 | 203 | 46.5 | 189 | 93.1 | 165 | 81.2 |
| Example 4 | 420 | 210 | 51.4 | 193 | 91.9 | 177 | 84.3 |
| Comparative Example 1 | 405 | 194 | 47.9 | 170 | 87.6 | 143 | 73.7 |
| Comparative Example 2 | 278 | 246 | 85.4 | 195 | 79.3 | 162 | 65.9 |
| Comparative Example 3 | 652 | 172 | 26.4 | 148 | 86.0 | 121 | 70.3 |

As shown in Table 1, the half-cells obtained from Examples 3 and 4 have superior charge capacity to those of Comparative Examples 1 to 3 during the 0.2 C charge and discharge.

In addition, it is understood that the half-cells obtained from Examples 3 and 4 have lower low-rate discharge capacity than the half-cell of Comparative Example 2 and lower low-rate coulomb efficiency than those of Comparative Examples 1 and 2, but the discharge capacity is further improved when increasing the charge and discharge speed (C-rate), and particularly, the discharge capacity is very much improved compared to those of Comparative Examples 1 to 3 during the 10 C charge and discharge.

It is clear that the half-cells obtained from Examples 3 and 4 have superior high-rate charge and discharge characteristics to half-cells obtained from Comparative Examples 1 to 3 by seeing the 5 C capacity % and the 10 C capacity %.

While these embodiments have been described in connection with what is presently considered to be practical example embodiments, it is to be understood that the embodiments is not limited to the disclosed embodiments, but, on the contrary, is intended to cover various modifications and equivalent arrangements included within the spirit and scope of the appended claims.

What is claimed is:

1. A negative electrode for a secondary lithium battery, comprising:
   a current collector; and
   a negative active material layer formed on the current collector,
       wherein the negative active material layer comprises an additive and a negative active material, and
       wherein the additive comprises a metal oxide core uniformly coated with a metal coating layer;
       wherein the metal coating layer is included at from about 20 wt % to about 70 wt % based on the total weight of the additive.

2. The negative electrode for a secondary lithium battery of claim 1, wherein the metal coating layer comprises a metal selected from the group consisting of Ni, Cu, Mn, Co, Fe, and a combination thereof.

3. The negative electrode for a secondary lithium battery of claim 1, wherein the metal coating layer has a thickness of from about 1 nm to about 100 nm.

4. The negative electrode for a secondary lithium battery of claim 1, wherein the core has a specific surface area of from about 50 m2/g to about 1000 m2/g.

5. The negative electrode for a secondary lithium battery of claim 1, wherein the metal oxide is selected from the group consisting of $SiO_2$, $Al_2O_3$, $VO_2$, $SrO_2$, $Y_2O_3$, $ZrO_2$, $CeO_2$, $MgO$, $Ce_2O_3$, and a combination thereof.

6. The negative electrode for a secondary lithium battery of claim 1, wherein the additive is included at from about 1 wt % to about 30 wt % based on the total weight of the negative active material layer.

7. The negative electrode for a secondary lithium battery of claim 1, wherein the additive further comprises a carbon coating layer formed on the surface of the metal coating layer.

8. The negative electrode for a secondary lithium battery of claim 7, wherein the carbon coating layer comprises a material selected from the group consisting of citric acid, sucrose, dihydroxy naphthalene, phenol resin, polyvinylchloride, and a combination thereof.

9. The negative electrode for a secondary lithium battery of claim 7, wherein the carbon coating layer has a thickness of from about 1 nm to about 10 nm.

10. The negative electrode for a secondary lithium battery of claim 7, wherein the carbon coating layer is included at from about 1 part by weight to about 20 parts by weight based on 100 parts by weight of the additive.

11. A secondary lithium battery comprising:
    a negative electrode comprising a current collector; and a negative active material layer formed on the current collector, wherein the negative active material layer comprises an additive and a negative active material, and wherein the additive comprises a core comprising a metal oxide and a metal coating layer formed uniformly on core;
    a positive electrode comprising a positive active material; and
    a non-aqueous electrolyte;
    wherein the metal coating layer is included at from about 20 wt % to about 70 wt % based on the total weight of the additive.

12. The secondary lithium battery of claim 11, wherein the metal coating layer comprises a metal selected from the group consisting of Ni, Cu, Mn, Co, Fe, and a combination thereof.

13. The secondary lithium battery of claim 11, wherein the metal coating layer has a thickness of from about 1 nm to about 100 nm.

14. The secondary lithium battery of claim 11, wherein the core has a specific surface area of from about 50 m.sup.2/g to about 1000m.sup.2/g.

15. The secondary lithium battery of claim 11, wherein the metal oxide is selected from the group consisting of $SiO_2$, $Al_2O_3$, $VO_2$, $SrO_2$, $Y_2O_3$, $ZrO_2$, $CeO_2$, $MgO$, $Ce_2O_3$, and a combination thereof.

16. The secondary lithium battery of claim 11, wherein the additive is included at from about 1 wt % to about 30 wt % based on the total weight of the negative active material layer.

17. The secondary lithium battery of claim 11, wherein the additive further comprises a carbon coating layer formed on the surface of the metal coating layer.

18. The secondary lithium battery of claim 17, wherein the carbon coating layer has a thickness of from about 1 nm to about 10 nm.

* * * * *